United States Patent [19]

Eichenhofer et al.

[11] Patent Number: 4,665,781
[45] Date of Patent: May 19, 1987

[54] MULTI-SPINDLE CHUCKING MACHINE

[75] Inventors: Josef Eichenhofer, Brampton, Canada; Karl P. Schubert, Cleveland, Ohio

[73] Assignee: Hofer Industries Inc., Mississauga, Canada

[21] Appl. No.: 704,792

[22] Filed: Feb. 25, 1985

[51] Int. Cl.$^4$ .............................................. B23B 9/10
[52] U.S. Cl. ......................................................... 82/3
[58] Field of Search .................................. 82/3, 28 R

[56] References Cited

U.S. PATENT DOCUMENTS

| | | | |
|---|---|---|---|
| 1,512,381 | 10/1924 | Turcott | 82/3 |
| 3,292,466 | 12/1966 | Jacoby | 82/3 |
| 3,688,363 | 9/1972 | Thobroe | 82/3 |
| 3,990,133 | 11/1976 | Schalles et al. | 82/3 |
| 4,185,366 | 1/1980 | Gilbert | 82/3 |

FOREIGN PATENT DOCUMENTS

| | | | |
|---|---|---|---|
| 2156458 | 5/1973 | Fed. Rep. of Germany | 82/3 |
| 2333635 | 2/1974 | Fed. Rep. of Germany | 82/3 |
| 918231 | 2/1963 | United Kingdom | 82/3 |
| 1373152 | 11/1974 | United Kingdom | 82/3 |

Primary Examiner—Leonidas Vlachos
Attorney, Agent, or Firm—Rogers, Bereskin & Parr

[57] ABSTRACT

A machine tool includes a carrier supporting a plurality of rotary spindles each carrying a chuck for holding a workpiece. The carrier can be indexed to move the spindles between different stations. In one aspect of the invention, individual drive motors are provided. The drive motors remain stationery while the carrier is indexed and clutches are provided to couple each drive motor to a spindle to be driven. In another aspect of the invention, the carrier includes a central shaft supported at its ends on bearings and spindles are coupled to the shaft by supports.

13 Claims, 13 Drawing Figures

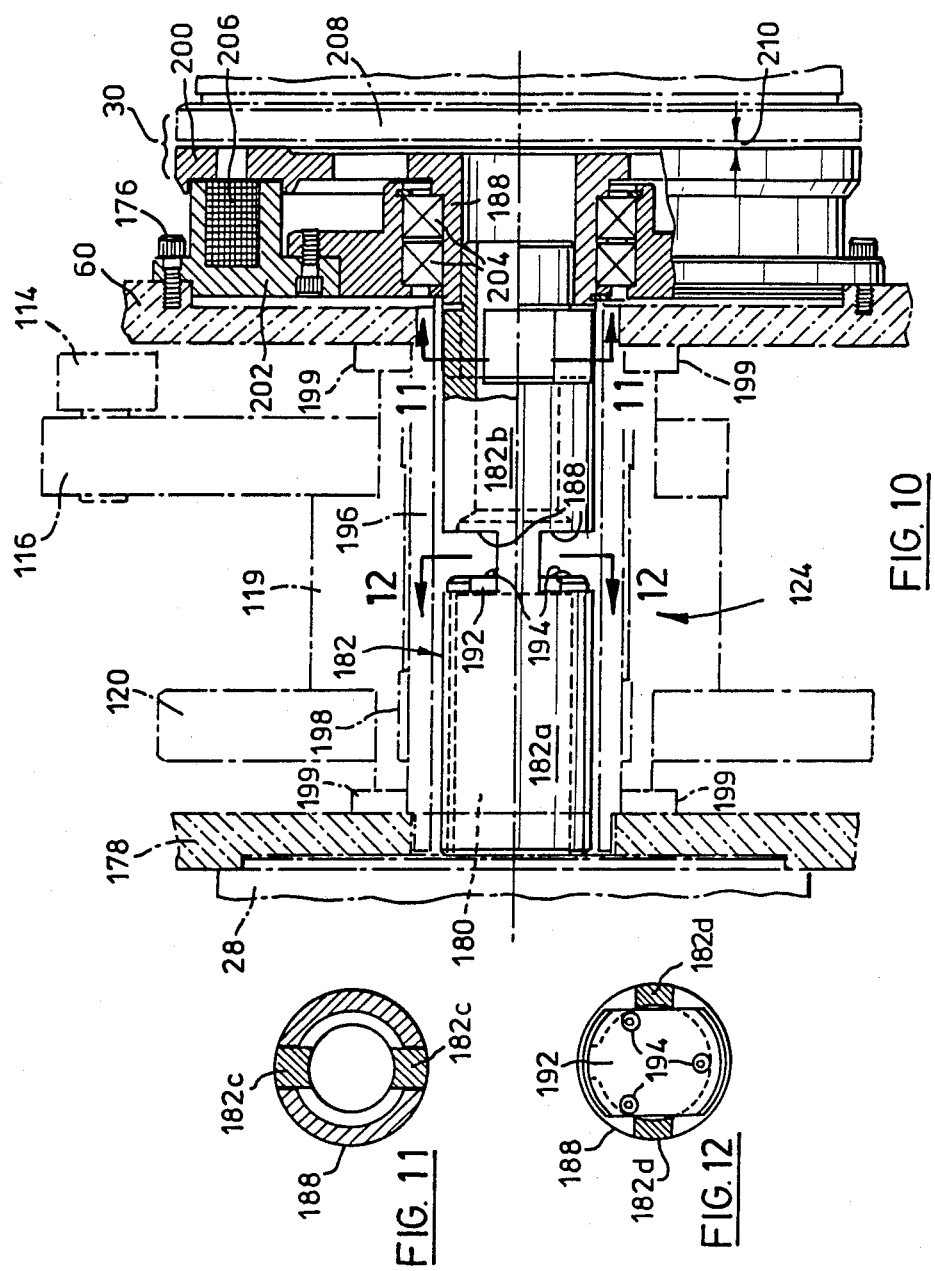

MULTI-SPINDLE CHUCKING MACHINE

BACKGROUND OF THE INVENTION

1. Field of the Invention

This invention relates generally to machine tools and is concerned more particularly with machine tools of the type known as "multi-spindle chucking machines".

A machine tool of this type includes a series of driven rotary spindles, each provided with a chuck or other device in which a workpiece can be held and presented to a stationary tool for machining. Multi-spindle machines are particularly useful where multiple machining operations are required to be performed on each of a succession of similar workpieces. A typical example of such a requirement is in the manufacture of automotive disc brake rotors, where each of a succession of cast rotor blanks must be machined at different speeds in forming the finished rotor.

2. Description of Prior Art

A typical prior art multi-spindle chucking machine for use in the manufacture of disc brake rotors includes a series of rotary spindles (typically two or three) mounted parallel to one another in a carrier and each provided at one end with a chuck which protrudes from the carrier for carrying a rotor blank to be machined. The spindles are driven at different but fixed speeds from a single drive motor through a mechanical gear transmission which allows the carrier to be indexed to present each blank to successive tools for machining at different speeds. The carrier is of generally cylindrical shape overall and is supported at its periphery in large diameter annular bearings which encircle the carrier. A splined locking arrangement is provided for retaining the carrier in a position to which it has been indexed.

Prior art machines of this type suffer from a number of disadvantages. For example, the fact that the spindles are driven at fixed speeds restricts the versatility of the machine. In some cases, it would be desirable to be able to vary the machining speed, for example, to take advantage of different cutting tools and/or to be able to accommodate different workpieces, e.g. disc brake rotors for different model cars. The fixed gear transmission arrangements of the prior art make this practically impossible.

Another disadvantage is that the large annular bearings required to support the carrier are extremely expensive. Not only does this make the initial capital cost of the machine high, but maintenance costs are high because the bearings tend to wear out. A related difficulty is that the bearing tolerances must be held to within fine limits because any radial movement of the carrier will have a detrimental effect on the accuracy of machining. These close tolerances in turn make the bearings vulnerable to ambient temperature variations which, in some circumstances, can cause the tolerances to diminish to the point at which the carrier becomes extremely difficult to index. This, in turn, means that high power capacity drives must be used in the indexing mechanism. A still further disadvantage is that the splined locking mechanism conventionally provided for the carrier of prior art multi-spindle chucking machines is extremely costly to manufacture and vulnerable to wear and jamming due to the presence of workpiece chips and other debris inevitably encountered in a production machine shop environment.

An object of the present invention is to provide a number of improvements in multi-spindle chucking machines aimed at addressing these problems.

BRIEF DESCRIPTION OF THE INVENTION

In one aspect the machine provided by the invention includes a frame, a plurality of spindles each rotatable about an axis and each including workpiece holding means at a first end of the spindle, and a carrier supporting the spindles in axially parallel positions with the workpiece holding means accessible at a first end of the carrier. Means is provided for indexing the carrier about an axis parallel to the spindle axes to move the spindles between defined stations. Spindle drive means are supported by the frame adjacent a second end of the carrier and include a plurality of individual spindle drive motors, each disposed in a fixed position and aligned with one of said stations. The machine also includes clutch means comprising respective driven clutch members at a second end of each said spindle and cooperating driving clutch members drivably coupled to each spindle drive motor. The clutch means are operable to drivingly couple each spindle drive motor to the relevant one of the spindles when the carrier has been indexed to bring that spindle to one of the said stations at which a machining operation is to be performed, and are disengageable to permit indexing of the carrier.

In summary, individual drive motors are provided for the spindles and the motors remain stationary while the spindles are indexed in the carrier to successive stations (at least one of which will be a machining station). This arrangement has the significant advantage that each spindle can be driven independently of the other spindles which allows for the use of variable speed motors for varying the machining speed of each spindle independently of the machining speeds of the other spindles.

Another aspect of the invention which addresses the problem of supporting the carrier for indexing provides a machine tool comprising a frame, a plurality of spindles each rotable about an axis and each including workpiece holding means at an end of the spindle, and a carrier supporting the spindles in axially parallel positions for indexing about an axis parallel to said spindle axes. In this aspect of the invention, the carrier includes a central shaft defining the said carrier axis, and spindle support means coupled to said shaft inwardly of its ends and supporting the spindles with the said work-piece holding means exposed at a first end of the carrier. Means is provided supporting the shaft on the frame at positions outwardly of the carrier for permitting turning of the carrier about its said axis to index the spindles between machining stations. The shaft extends beyond the first end of the carrier a distance sufficient to permit said indexing and machining of workpieces at the machining stations without interference by said support means. Means is also provided for indexing the carrier and means is also provided for driving the spindles for machining workpieces carried thereby.

By supporting the spindles on a carrier which includes a central shaft, the problem of large diameter annular bearings encircling the whole carrier is avoided. Much smaller and less costly bearings can be used adjacent the ends of the shaft, which not only reduces the overall cost of the machine but also makes the machine significantly less expensive to maintain. Bearing tolerance problems are also reduced by using smaller bearings. At the same time, the accuracy of machining is not adversely affected provided the carrier itself is rigidly constructed.

BRIEF DESCRIPTION OF THE DRAWINGS

In order that the invention may be more clearly understood, reference will now be made to the accompanying drawings which illustrate a number of preferred embodiments of the invention by way of example, and in which.

FIG. 10 is a elevational view, partly in section, showing the drive coupling between a typical one of the drive motors of the machine and a typical spindle transmission, and may be regarded as a continuation of the left hand end of FIG. 8;

FIGS. 11 and 12 are sectional views on lines 11—11 and 12—12 respectively of FIG. 10.

DESCRIPTION OF PREFERRED EMBODIMENTS

Figure 1:
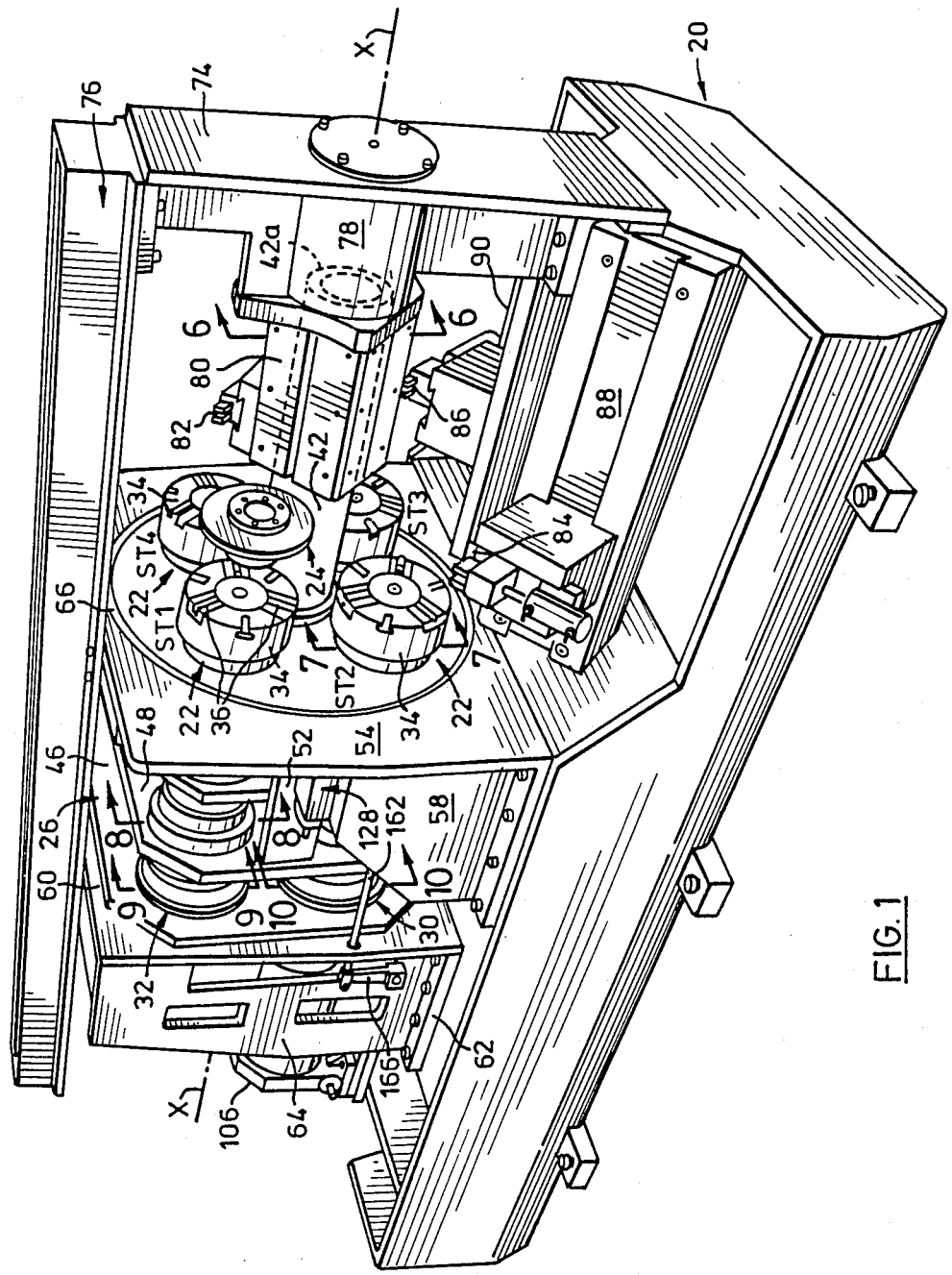
FIG. 1 is a perspective view from one end of a multi-spindle chucking machine in accordance with the invention.
Figure 2:
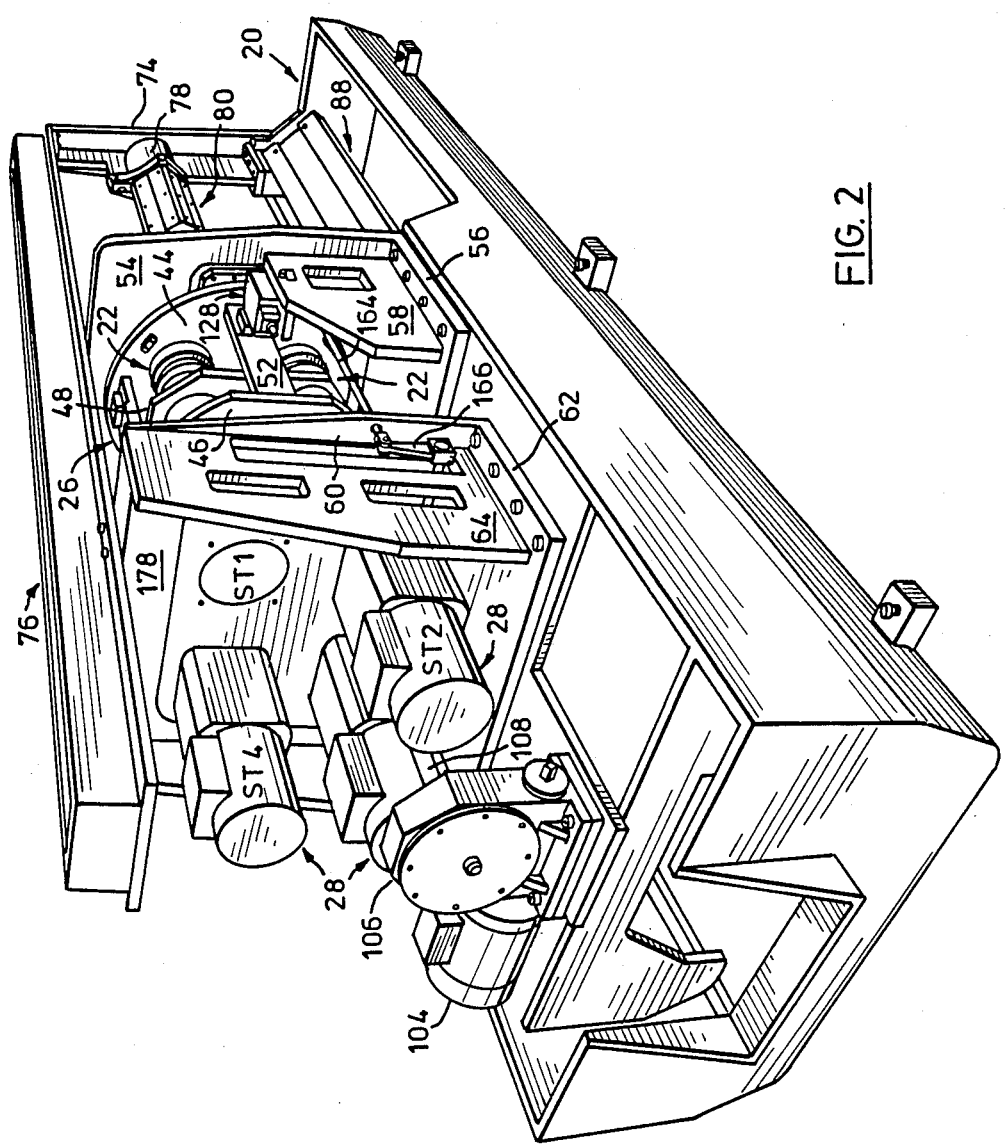
FIG. 2 is a perspective view of the machine shown in FIG. 1, taken from the same side and the opposite end.

Referring to the drawings, FIGS. 1 and 2 may be taken as respectively front and rear perspective views of the machine, in that FIG. 1 best shows the part of the machine at which machining operations will be performed while FIG. 2 shows the opposite end of the machine including the spindle drives and indexing arrangement (all of which will normally be concealed from view by a cover—not shown). The frame of the machine is generally indicated by reference numeral 20 and the spindles (which are largely concealed in those views) are denoted 22. A typical workpiece in the form of a disc brake rotor blank is shown at 24 in FIG. 1, in position preparatory to loading into one of the spindles. A carrier supporting the spindles is denoted 26.

Three spindle drive motors are visible in FIG. 2 and are denoted individually by reference numeral 28. The motors are all identical electric infinitely variable speed motors sold under the trade mark FANUC by Fujitsu of Japan. As best seen in FIG. 1, the machine, in fact, includes four spindles 22 although only three of the spindles are driven at any one time; the first spindle remains stationary for laoding while machining operations can be performed on workpieces carried by the other three (driven) spindles. Carrier 26 is indexed (as will be described) to move the spindles successively through four stations (three machining stations and one loading station). For ease of reference, in FIG. 1 the four stations have been marked as ST 1 to ST 4. Station ST 1 is the loading station whereas ST 2 to ST 4 are machining stations.

The four spindles are identical and are indexed successively through all four stations by turning carrier 26. The three spindle drive motors 28 are aligned with the spindles at stations ST 2, ST 3 and ST 4 and are correspondingly marked in FIG. 2. The motors 28 remain stationary as carrier 26 is indexed and electrically operated clutches provide a drive coupling between the three spindles at stations ST 2, ST 3 and ST 4 and the three drive motors 28 during machining. The clutches are deenergized during indexing of carrier 26. The clutches will be described in more detail later. For present puspose, it is sufficient to note that part of one of the clutches at staion ST 2 is visible at 30 in FIG. 1 and that similar clutches are provided at stations ST 3 and ST 4. A brake unit 32 is provided for the spindle which is in position ST 1 and is operable to hold that unit stationary for loading and unloading of a workpiece.

Each spindle extends from the position of the relevant clutch (as clutch 30) or brake unit 32 as the case may be to a chuck assembly which is exposed at the right hand end of carrier 26 as it is seen in FIG. 1. The chuck assemblies for all four spindles are essentially identical and are denoted by reference numeral 34. The chucks themselves are essentially conventional hydraulically operated units having guideways 36 on their outer faces for receiving jaws for clamping the workpiece. the jaws have not been shown in FIG. 1 but two typical jaws are shown at 38 in FIG. 7. In view of their essentially conventional form, the chuck assemblies have not been shown in detail. A chuck operating piston is indicated at 40 in FIG. 7 within the spindle and is displaced longitudinally to operate the jaws, as will be described in more detail later.

Figure 3:
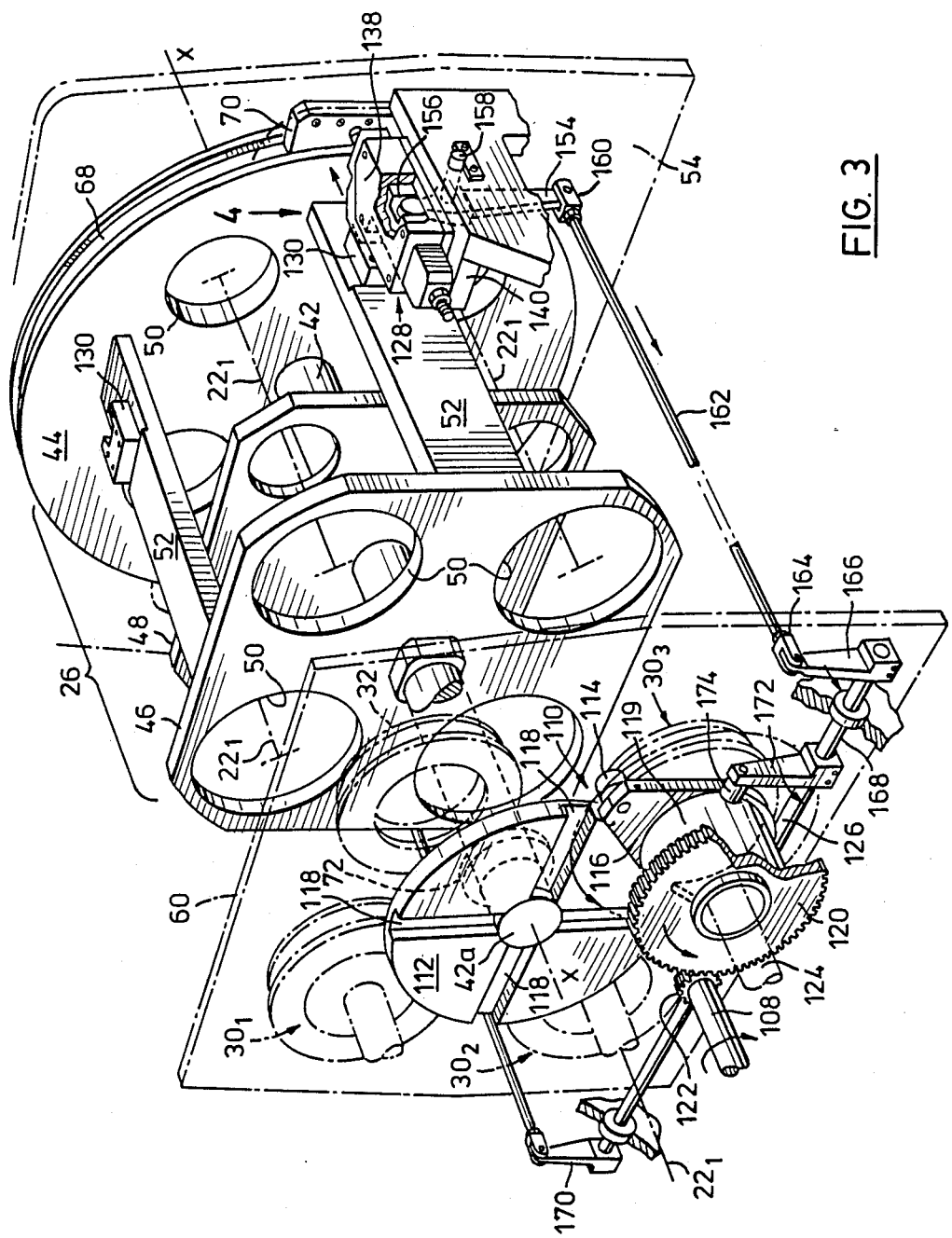
FIG. 3 is a partly exploded perspective view generally of the center portion of the machine as seen in FIG. 2.
Figure 7:
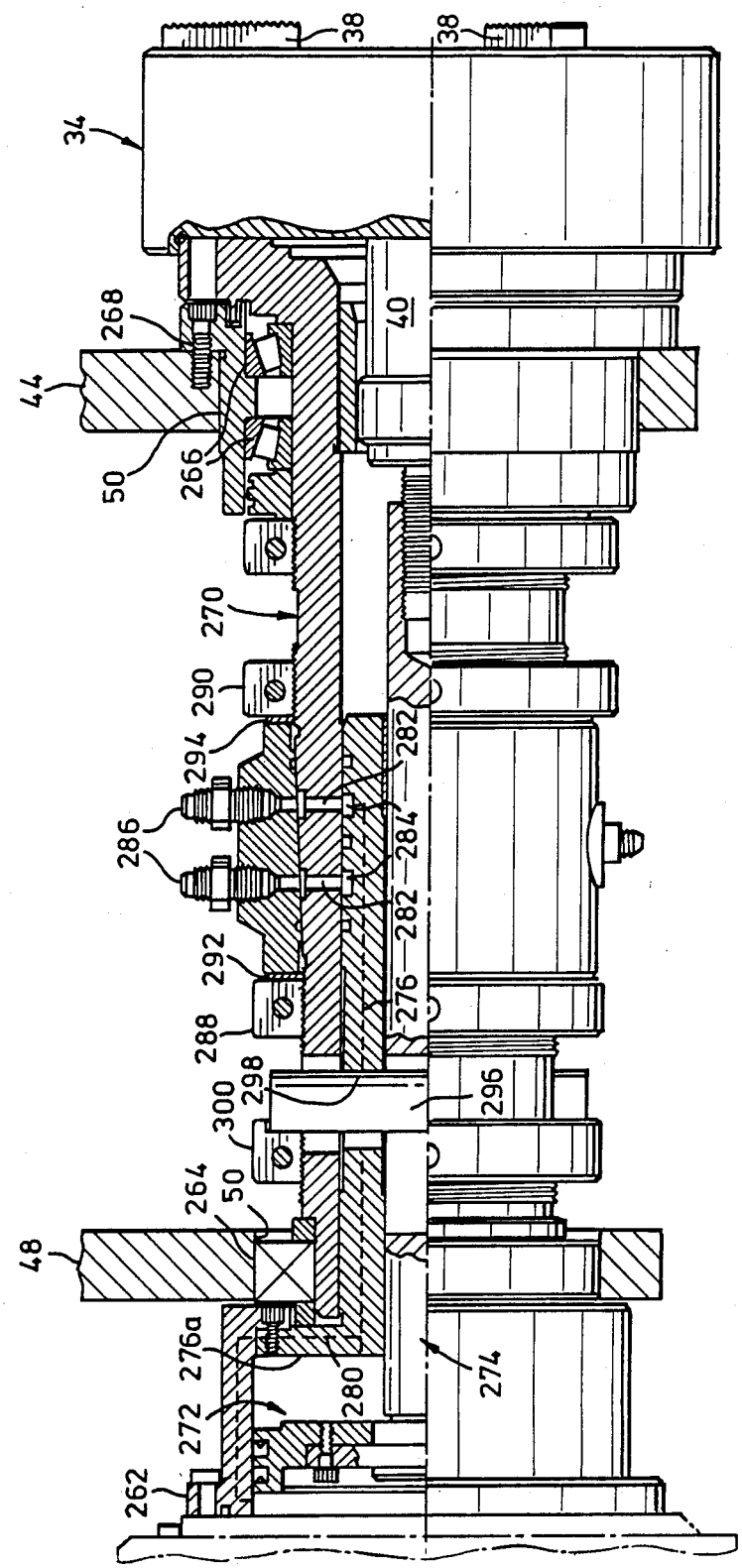

It will be apparent from a review of FIGS. 1 and 7 that the spindles 22 are generally of elongate cylindrical shape overall. The spindles are supported in carrier 26 in axially parallel positions with the chuck assemblies exposed at one end (the "front" end) of the carrier. FIG. 3 shows some detail of the carrier construction; in that view, the spindles themselves have been omitted for clarity of illustration but their rotational axes are indicated by chain dotted lines at $22_1$. The rotational axis of the carrier itself is parallel to the axes $22_1$ and is indicated at X—X in FIGS. 1 and 3.

Carrier 26 includes a central shaft 42 which is disposed on axis X—X and supported in bearings at its ends (see later). In FIG. 3, only part of shaft 42 is in fact visible; the left hand end of the shaft as drawn is indicated at 42a while the shaft extends further to the right than shown. Welded to shaft 42 in planes generally normal to axis X—X are respective first and second carrier end plates 44 and 46, and an intermediate plate 48. These plates are formed with aligned holes, some of which are denoted 50, for receiving the spindles 22. The spindles are secured to the plates 44, 46 and 48 so that the spindles can rotate with respect to the plates. the plates 44, 46 and 48 are maintained parallel to one another by longitudinal bars, two of which are shown at 52 in FIG. 3 although four such bars are in fact provided at positions spaced 90 degrees from one another about axis X—X. The bars 52 are welded to the carrier plates 44, 46 and 48 to form a rigid welded carrier structure.

The plates 46 and 48 are made from square steel plate with the corners removed, while the first end plate 44 is circular. One face of plate 44 is exposed at the front of the machine as best seen in FIG. 1. Plate 44 is located in a circular opening in a further plate 54 which forms part of the frame 20 of the machine. It will be seen from FIG. 1 that plate 54 is in fact welded to a horizontal plate 56 which is bolted to a bed of the machine frame. The two plates 54 and 56 are braced by welded gusset plates, one of which is visible at 58 in FIGS. 1 and 2. A second plate 60 similar to plate 54 is provided at a slight spacing from the rear (left hand) end of carrier 26 as seen in FIG. 1 and is similarly welded to a horizontal plate 62 bolted to the machine bed and braced to plate 60 by two side gussets 64 (see also FIG. 2). Thus, plate 60 essentially forms part of the frame of the macine. This plate rotatably supports the rear end of the mainc arrier shaft 42 as will be described.

Referring back to FIG. 1, the circular end plate 44 of the carrier is a clearance fit in a complementary circular opening in plate 54. The narrow annular gap between the two plates 44 and 54 is covered by a flexible seal 66 designed to prevent workpiece chips and other debris passing through the gap. As noted previously the machine is provided with a cover which is not shown in FIG. 1. This cover fits around the side and top edges of plate 54 and encloses the parts of a machine behind the plate 54. These parts are accordingly well protected against ingress of debris.

Referring back to FIG. 3, it will be seen that the circular carrier end plate 44 is provided with a peripheral groove 68 rearwardly of plate 54 (plate 54 is shown in ghost outline in FIG. 3). This groove receives a pair of thrust bearing pads at diametrically opposite sides of plate 44, one of which is shown at 70. These pads are adjustably bolted to the rear face of plate 54 and fit closely within groove 68 so as to resist axial thrust imposed on the carrier during machining. It should be noted that these pads do not rotationally support the carrier. The carrier is rotationally supported solely by way of its central shaft 42 as discussed previously.

The left hand (rear) end of shaft 42 as shown in FIG. 3 is supported by the plate 60 which essentially forms part of the machine frame as described above. In FIG. 3, that plate is shown in ghost outline and it will be seen that shaft 42 extends through plate 60 and is supported by a bearing indicated at 72 mounted on the rear side of plate 60 (the side remote from carrier 26). Shaft 42 then extends forwardly through the plates 46, 48 and 44 and projects outwardly from the front face of plate 44 as best seen in FIG. 1. In that view, the front end face of shaft 42 is shown in dotted outline at 42a. This end of the shaft is rotatably supported by bearings in a support column 74 which again forms part of the frame 20 of the machine. Column 74 and the main frame plates 54 and 60 are braced with respect to one another by a horizontal beam 76 which extends longitudinally of the machine from end to end thereof. This form of frame construction imparts great rigidity to the machine which maximized accuracy of machining.

In any event, referring back to shaft 42, FIG. 6 shows the front end portion of shaft 42 in section and illustrates the manner in which the shaft is rotationally coupled to column 74. It will be seen from FIGS. 1 and 6 that the column is shaped to provide a hub 78 into which shaft 42 extends. Adjacent hub 78, shaft 42 also passes through a tool rest 80 for supporting stationary cutting tools such as the tool shown at 82 in FIG. 1. Other tools are shown at 84 and 86 supported upon tool holders 88 and 90 carried by the frame of the machine. The tools shown are for illustration purposes only and are not intended to be accurate representations of actual tools. Conventional tools and tool actuating devices will be used to position and feed the tools into workpieces carried by the spindles.

Figure 6:
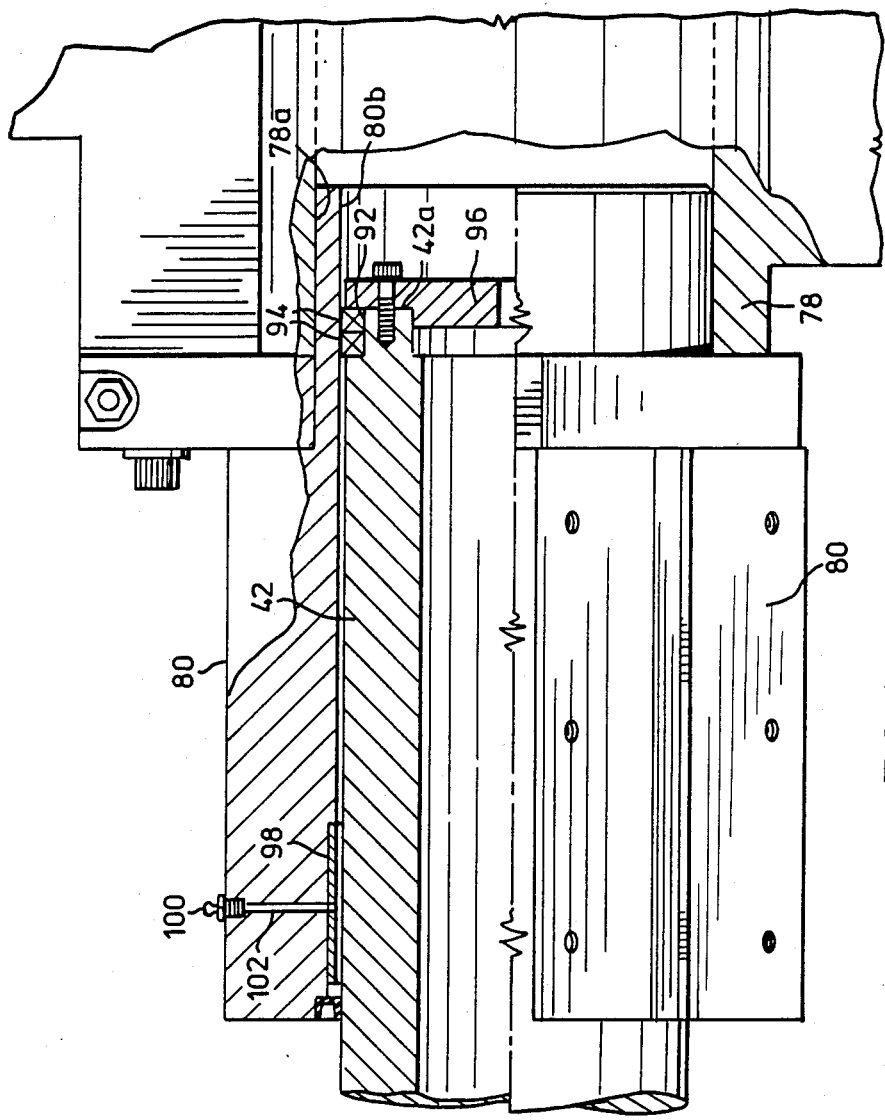
FIGS. 6 and 7 are sectional views on line 6—6 and 7—7 respectively of FIG. 1.

Returning to a consideration of FIG. 6, tool holder 80 is formed with a cylindrical projection 80a at its end adjacent the support column hub 78 and this projection is received in a complementary recess 78a in hub 78. Tool rest 80 has an internal bore 80b which receivews the shaft 42. At its extreme forward end 42a, shaft 42 is provided with an annular rebate 92, which receives a pair of roller bearings 94 arranged to ride on the internal surface of bore 80b. A bearing retainer 96 is bolted to the end of shaft 42.

Adjacent its opposite end, the tool rest 80 is supported on shaft 42 by way of a bushing 98 and a grease nipple 100 and corresponding bore 102 are provided for lubricating the interface between shaft 42 and tool rest 80.

In this way, the forward end of shaft 42 is rotationally supported by relatively small diameter bearings without the need for the large and costly annular bearings of the prior art. At its opposite end shaft 42 is similarly supported by the relatively small diameter bearing 72 on frame plate 60 of the machine. In summary, the carrier is supported solely by its main central shaft 42, which shaft is carried at ends in bearings supported from the frame of the machine.

Indexing of carrier 26 is accomplished by a Geneva cam mechanism driven from a motor drive at the rear of the machine. Referring to FIG. 2, the carrier indexing drive motor is an electric motor denoted 104 which is coupled to a worm drive gear box 106 having an output shaft 108 extending generally longitudinally of the machine. Shaft 108 is also shown at the left hand end of FIG. 3. Drive is transmitted from shaft 108 to the main central shaft 42 of the carrier by way of a Geneva cam mechanism 110. This mechanism includes a hub 112 which is secured to the rear end portion of shaft 42 and a cam follower 114 carried by an arm 116. Follower 114 engages successively in each of four radial cam tracks 118 in the rear face of hub 112. Follower 114 circulates continuously (while motor 104 is operating) in a circular path indicated at 114a in FIG. 3. If motor 104 continues to operate, cam follower 114 will successively enter each of the tracks 118 and will intermittently turn hub 112 and with it, the carrier 26 through a 90 degree increment as follower 114 moves along the relevant track and displaces hub 112 clockwise as drawn. The arm 116 which carries the cam follower 114 is coupled by a collar 119 to a spur gear 120 which meshes with a smaller gear 122 on the drive shaft 108 from motor 104. Motor 104 will of course be controlled by the control system of the machine to index the carrier in accordance with the particular sequence of operations required of the machine.

The Geneva cam follower assembly 114, 116 and its driving gear 120 are mounted co-axially on a shaft indicated in ghost outline at 124 which is driven by the spindle drive motor 28 at station ST 2 as will be described later. The arrangement is such that the gear 120 and the cam follower assembly 114, 116 can turn independently of shaft 124. Also mounted on arm 116 to turn about the axis of shaft 124 is an arcuate cam segment 126 which is used to operate mechanisms for latching the carrier in a position to which it has been indexed. One of these latching mechanisms is generally denoted by reference numeral 128 in FIG. 3 and an identical mechanism is provided at the opposite side of the carrier but is not visible in FIG. 3. The latching mechanisms 128 cooperate with latch blocks 130 mounted one on each of the four longitudinal bars 52 of the carrier structure. In FIG. 3, mechanism 128 is shown engaged with one of these latch blocks 130 and a similar latch block is shown on the bar 52 which appears at the top in FIG. 3. Details of mechanism 128 and a typical one of the latch blocks are shown in FIGS. 4 and 5.

Figure 4:
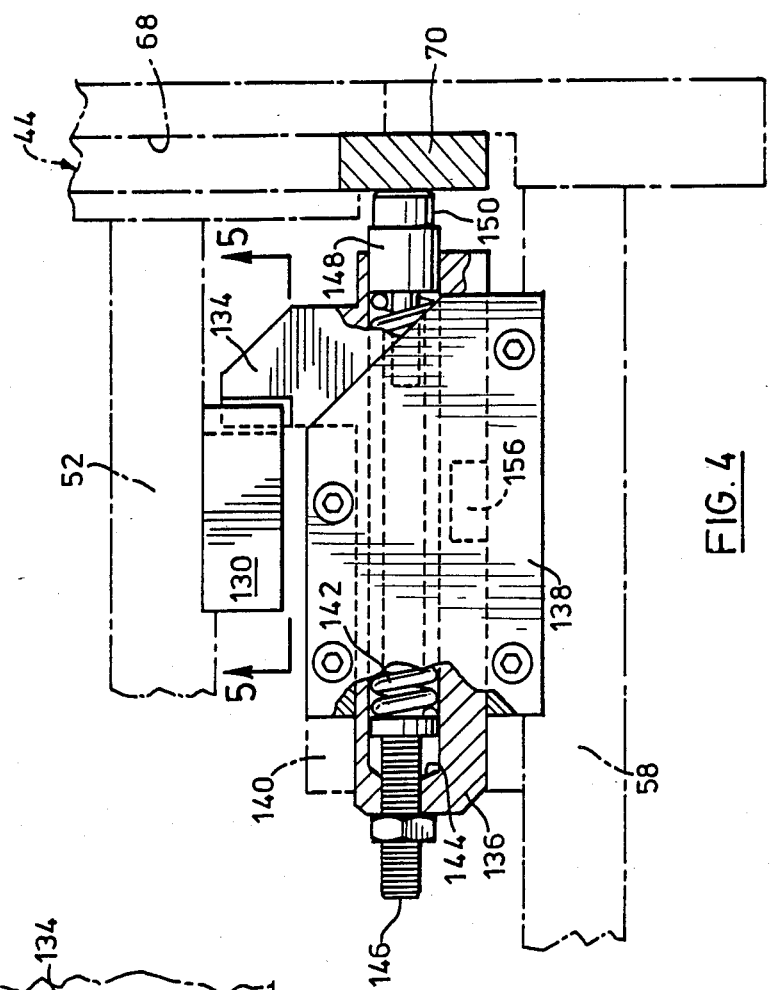
FIG. 4 is a detail plan view in the direction of arrow 4 in FIG. 3.
Figure 5:
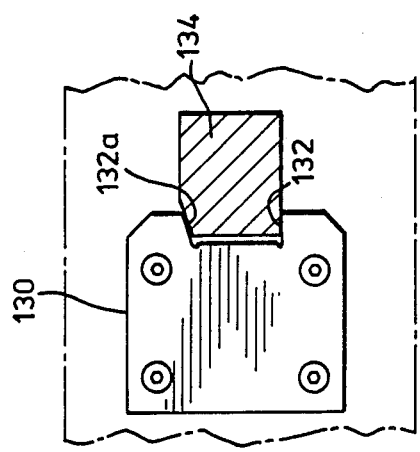
FIG. 5 is a sectional view on line 5—5 of FIG. 4.

Referring first to FIG. 5, it will be seen that the latch block 130 has a slot 132 in one face and that one lateral wall of the slot is bevelled as indicated at 132a. A latch bolt 134, part of which is visible in FIG. 5, is shaped to engage in slot 132 and has a corresponding bevel; bolt 134 is dimensioned to wedge into the slot before becoming fully seated therein. Latch bolt 134 extends laterally from a slide member 136 (FIG. 4) mounted to slide longitudinally in a housing 138 bolted to the frame of the machine. Referring back to FIG. 3, it will be seen that this is accomplished by bolting housing 138 to a lateral "shelf" 140 carried by one of the gusset plates 58 referred to above.

A helical compression spring 142 is located in a bore 144 in member 136 and acts between the head of an adjustment bolt 146 which is threaded into an opening in one end of member 136 and projects outwardly therefrom, and a plunger 148 at the opposite end of bore 144. Plunger 148 is a free sliding fit in bore 144 and bears against the thrust pad 70 of the carrier (see FIG. 3).

FIG. 4 shows the latching mechanism in the position in which carrier 26 has been latched and is held stationary as for machining. Spring 142 is calibrated to hold the latch bolt 134 in engagement with the latch block at this time. Unlatching is effected by displacing slide member 136 to the right in FIG. 4, thereby effectively compressing spring 142, whcih consequently provides a spring biased latching force. Botl 146 is adjustable to vary the spring biasing effect and is provided with a lock nut 152.

This unlatching movement of member 136 to the right in FIG. 4 is effected automatically from the cam follower segment 126 referred to previously and discussed in connection with FIG. 3. Referring back to that view, a latch release lever 154 extends upwardly into the latching mechanism and is received at its upper end in a recess 156 in slide member 136 (recess 156 is also shown in FIG. 4). Lever 154 is pivoted on a pivot shaft 158. At its lower end, lever 154 is fitted with a yoke 160 coupled to a pull rod 162 which extends rearwardly of the machine and which is coupled at its rearward end by a further yoke 164 to the upper end of a lever 166. That lever is itself carried by a cross shaft 168 which extends to the far side of the machine as seen in FIG. 3, where it is provided with asimilar lever 170 for operating the latching mechanism at the other side of carrier 26.

Adjacent cam segment 126, shaft 168 carries with a further lever 172 which supports a cam follower 174 arranged to engage the cam segment 126. Thus, when follower 174 rides up segment 126, all three levers 172, 166 and 170 will pivot so that their upper ends move rearwardly exerting a pull on the pull rod 162 and on the corresponding rod at the opposite side of the machine, and releasing both latch mechanisms. Cam segment 126 is positioned to release the latch mechanisms just before the Geneva cam follower 116 enters the Geneva hub cam track 118 and begins to rotate the carrier. Conversely, after carrier indexing has been completed, follower 174 will leave the cam segment 126 and the latch mechanisms will re-engage by virtue of their internal spring biasing. The bevels 132a in the latch block slot and the corresponding bevel on the latch bolt will ensure positive location of the carrier even if some initial misalignment should occur.

Reference will now be made to FIGS. 7 to 12 in describing a typical one of the spindles 22 of the machine and the manner in which the spindles are driven at positions ST 2, 3 and 4 of the machine.

Figure 8:
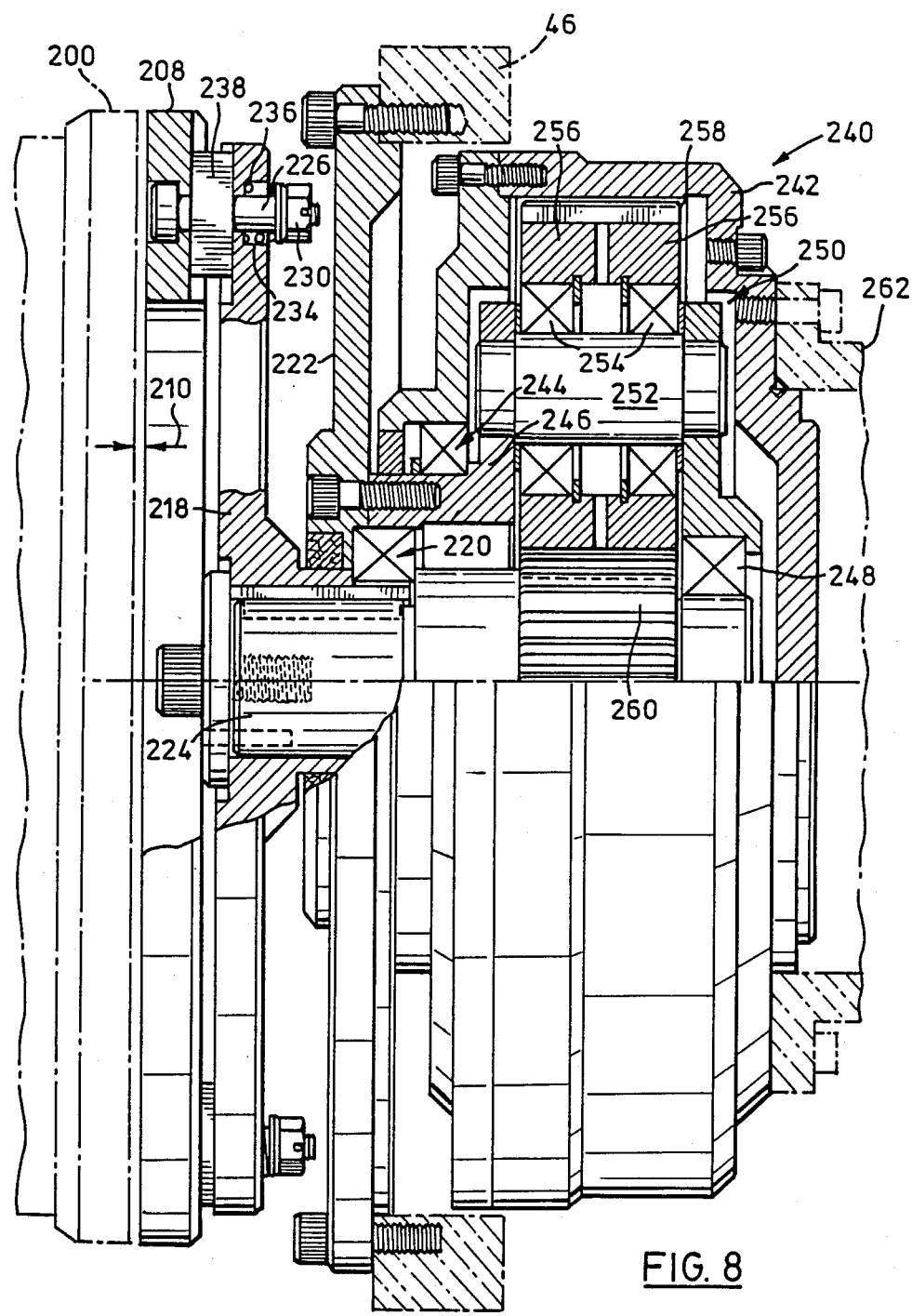
FIG. 8 is a vertical sectional view through part of the drive transmission in a typical one of the spindles of the machine and may be considered as an extension of the left hand end of FIG. 7.
Figure 9:
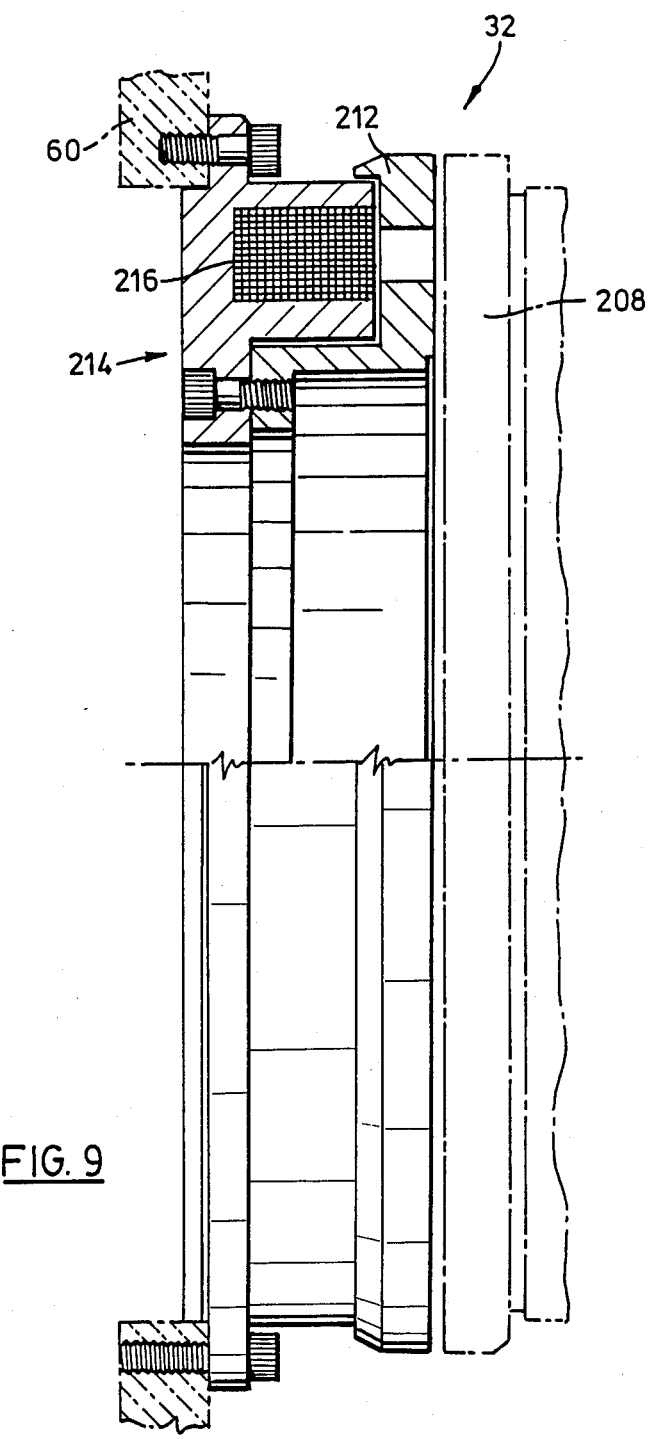
FIG. 9 is a sectional view on line 9—9 of FIG. 1.

For clarity of illustration, various parts of the spindle 22 are shown in different views of the drawings. FIG. 7 shows the main body of the spindle. FIG. 8 shows a transmission arrangement which is incorporated in the spindle and may be considered as a continuation of the left hand end of FIG. 7; part of a typical one of the clutches (as clutch 30) is also shown in ghost outline in FIG. 8, FIG. 9 shows the brake 32 used at position St 1. FIG. 10 shows the coupling between one of the clutches (as clutch 30) and a typical one of a spindle drive motors 28. FIGS. 11 and 12 shows details of FIG. 10.

As noted previously, the machine includes three clutches disposed at the positions of stations ST 2, ST 3 and ST 4 respectively and one brake at the position of station ST 1. In FIG. 3 the three clutches and the brake are shown in ghost outline in the positions they would occupy in practice. The brake is denoted 32 and the three clutches are denoted respectively $30_1$, $30_2$ and $30_3$. Each clutch is shown having an associated drive shaft from the relevant spindle motor 28. One of these shafts is the shaft 124 referred to previously as supporting the Geneva cam follower of 116, its drive gear 120 and the intervening collar 119. These latter components are shown in ghost outline in FIG. 10 and it will be seen from that view that the shaft referred to as shaft 124 in FIG. 3, in fact, comprises a shaft assembly providing means for coupling the relevant spindle drive motor 28 to the associated clutch 30. It will, of course, be understood that arm 116, collar 119 and gear 120 appear only at position ST 2 (see FIG. 3) although the shaft assembly 124 may be considered to be typical of the shaft assemblies associated with each of the three drive motors 28 and the associated clutches 30.

Referring first to FIG. 10, it will be seen that clutch 30 is bolted to the vertical plate 60 discussed above which essentially forms part of the frame of the machine. Two typical attachment bolts are shown as 176 in FIG. 10. A second vertical plate denoted 178 extends parallel to plate 60 between the side plates 64 (see FIGS. 1 and 2). As best seen in FIG. 2, plate 178 carries the spindle drive motors 28. The motors are secured to the plate by bolts (not shown). Referring back to FIG. 10, part of a typical one of the drive motors is shown at 28 in position adjacent plate 178. A motor drive shaft 180 extends forwardly through an opening in plate 178 and is shown in dotted outline at in FIG. 10. An inner portion 182a of a drive transmitting sleeve 182 encloses the motor drive shaft 180 and is keyed thereto as indicated at 186. The sleeve also includes an outer portion 182b shaped to define a part of lugs 182c (FIG. 11) which key to an input shaft 188 of clutch 30.

Intermediate the sleeve portions 182a and 182b, transverse slots are cut in the sleeve leaving a pair of lands 182d, as best seen in FIG. 12. An end cap 192 fits between these lands and is secured to the end face of the motor drive shaft 180 by bolts 194. Shaft assembly 124 is housed within a sleeve indicated in ghost outline at 196 which extends between and is received at its ends in openings in the plates 60 and 178 respectively. Sleeve 196 rotationally supports the Geneva cam follower arm 116, the spur gear 120, and the intermediate sleeve 119 by way of bearings 198. Spacers 199 locate these components between plates 60 and 178.

Each of the clutches 30 and the brake 32 is essentially a conventional electromagnetic unit. In FIG. 10, a driving plate of clutch 30 is denoted 200 and is coupled to the clutch input shaft 188 and rotationally supported with respect to a stationary part 202 of the clutch by bearings 204. Part 202 is bolted to plate 60 to plate 60 by the bolts 176 mentioned previously. An electromagnetic coil in stationary part 202 is shown at 206. A driven clutch plate shown in ghost outline at 208 in FIG. 10 is carried at the rear end of each of the spindles 22. The two plates 200 and 208 and the carrier 26 are designed so that, the carrier is indexed, the driven clutch plates 208 carried by the respective spindles move exactly parallel to one another, to the outer faces of the clutch driving plates (as plate 200) and to the corresponding plate of brake 32, so that a very narrow clearance gap 210 exists between the opposing faces of the respective clutch plates when the clutch is in its de-energized state. When the clutch is energized, the magnetic field generated within the stationary part 202 of the clutch draws the driven clutch plate 208 into tight driving engagement with the plate 200 so the drive is transmitted to the spindle.

Brake 32 (FIG. 9) operates in essentially the same fashion except in that the equivalent of the driving clutch plate 200 of FIG. 10 is stationary and there is no motor and shaft assembly associated with the brake. The equivalent of the clutch driving plate 200 is denoted 212 in FIG. 9 and comprises a generally annular plate bolted to a stationary component 214 of the clutch which is itself bolted to the plate 60 carried by the machine frame. An electromagnetic coil housed within component 214 is shown at 216. When the brake is energized, a magnetic field is produced which draws the driven plate 208 of the relevant spindle tightly against the plate 212 of the brake in essentially similar fashion to the way in clutch 30, except that the spindle plate 208 is held stationary instead of being driven.

FIG. 8 shows the driven spindle plate 208 (hereinafter called a clutch plate) partly in section and positioned at a spacing 210 from the end face of a plate which is denoted 200 in FIG. 8 to represent the clutch plate 200 of FIG. 10 but which may, in fact, be part of the brake 32 depending on which of the machine operating stations is being considered. Plate 208 is supported by a backing plate 218 which is in itself rotationally supported by a bearing 220 with respect to the carrier rearend plate, part of which is indicated at 46 in FIG. 8. The outer race of bearing 220 is, in fact, carried by a fixed plate 222 which is bolted to carrier end plate 46. The backing plate 218 is keyed to a central shaft 224 carried by the inner race of bearing 220.

Clutch plate 208 is supported with respect to the backing plate 218 by a series of bolts which are spaced around the peripheries of the respective plates and two of which are indicated at 226 and 228 in FIG. 8. Bolt 226, which may be taken as typical of all the bolts, extends forward (of the machine) from plate 208 through an opening in plate 218 and is fitted at its forward end with a nut 230 backed by a washer 232 and a helical compression spring 234 which acts between the washer 232 and the bottom of a recess 236 in plate 218. A spacer 238 carried by bolt 226 maintains a minimum spacing between the backing plate 218 and the clutch driven plate 208 but the springs, as spring 236, allow the plate 208 to move towards plate 200 (or plate 212), closing gap 210, when the clutch or brake as the case may be is operated. At the same time, the springs (as spring 236) provide a biasing force for retracting plate 208 and providing the required clearance 210 when the clutch or brake is deenergized.

In the illustrated embodiment, each of the spindles 22 incorporates a planetary gear-type transmission designed to "gear down" the speed of the motor so that the chuck of each spindle rotates at a speed less than the motor speed. In the particular application for which the machine being described was designed, it is desirable to maintain the speed of the drive motors at a relatively high speed (e.g. above 1200 RPM) to avoid loss in power when slow spindle machine speeds are required.

In FIG. 8, the transmission is generally denoted by reference numeral 240 and includes a generally drum-shaped casing 242 which rotates when the transmission is in operation and which is rotationally supported with respect to the carrier 46 by a bearing 244 running on a stationary planet gear carrier 246. As can be seen, carrier 246 is bolted to the fixed plate 222 supported by the carrier end plate 46. Carrier 246 is also rotationally supported with respect to the central shaft 224 by a further bearing 248. One of a series of three planet gears supported by carrier 246 is denoted 250. Gear 250 includes a stationary central shaft 252 which carries bearings 254 supporting a pair of gear wheels 256 which mesh both with an internal gear 258 inside casing 242 and an external gear 260 on shaft 224.

When the relevant spindle is engages with one of the clutches 30, the clutch is energized and the associated drive motor is operating, drive is transmitted through the clutch to the clutch backing plate 218 which rotates and turns shaft 224. The shaft 252 of the planet gears 250 are stationary so that, as shaft 224 turns, the planet gears turn on their stationary shafts and transmit drive to the casing 242 of the transmission, which also turns. Shown in ghost outline at 262 is a part of the forward section of the spindle; part 262 is bolted to casing 242 and accordingly turns with the transmission casing. Part 262 is also visible in FIG. 7, which will now be described.

In FIG. 7, the chuck 34 of the spindle is shown at the right hand (forward) spindle end as discussed previously. Also shown are carrier end plate 44 and intermediate plate 48. The spindle is fitted into the openings 50 (FIG. 3) in these plates by a single bearing 264 in the case of plate 48 and by a pair of oppositely directed taper roller bearings 266 in the case of plate 44. This latter roller bearing arrangement assures axial positioning of the spindle. The outer races of the bearing 266 are carried by a support 268 which is bolted to carrier plate 44. The inner races of those bearings support a main cylindrical body member 270 of the spindle which rotates while the spindle is in use. That member 270 also carries the inner race of bearing 264 at the position of plate 48. At its rearward end, member 270 is coupled to the spindle part 262 which is bolted to the transmission casing as discussed prevously.

Part 262 is shaped to form a cylinder for a piston 272 used to operate the jaws of the chuck 34. Piston 272 is carried at one end of a piston rod 274 which extends longitudinally through the main spindle body 270 to the chuck operating piston 40 (discussed above) and which is in turn coupled to the jaws of the chuck. Piston rod 274 slides within a sleeve member 276 which is disposed inside the main spindle body member 270 and which has a flange 272a at its rearward end. Flange 276a is secured by screws, one of which is indicated at 278, to spindle part 262.

Hydraulic oil is delivered opposite sides of piston 272 for displacing the piston through passageways 280 in cylinder member 276 and part 262. Those passageways communicate with passageways 282 through the main spindle body member 270 and open into circumferential grooves 284 in that member. A bronze bush 286 encircles the body member 270 at the positions of these grooves and is fitted with hydraulic hose couplings 286. This member remains stationary while the spindle is rotating and is located axially by a pair of split nuts 288, 290 which encircle the body member 270 and are threaded onto the member. Bearing pads 292 and 294 are provided at opposite ends of the bush.

Sleeve member 276 couples spindle part 262 and spindle body member 270 by way of a pin 296 which extends diametrically through both members 270 and 276 and protrudes from both sides of the main body member. A clearance opening in piston rod 274 allows reciprocation thereof without contacting pin 296. At one side, the pin bears against an edge 298 of an opening in a cylinder member 276; its other side, its pin is contacted by a split nut 300 which is similar to the nuts 288 and 290 and which is threaded on to the main body member. When disassembly of the spindle is required, nut 300 is slackened, allowing pin 296 to be removed, which then allows the cylinder member 276 to be withdrawn from within body member 270 to the left in FIG. 7.

Figure 13:
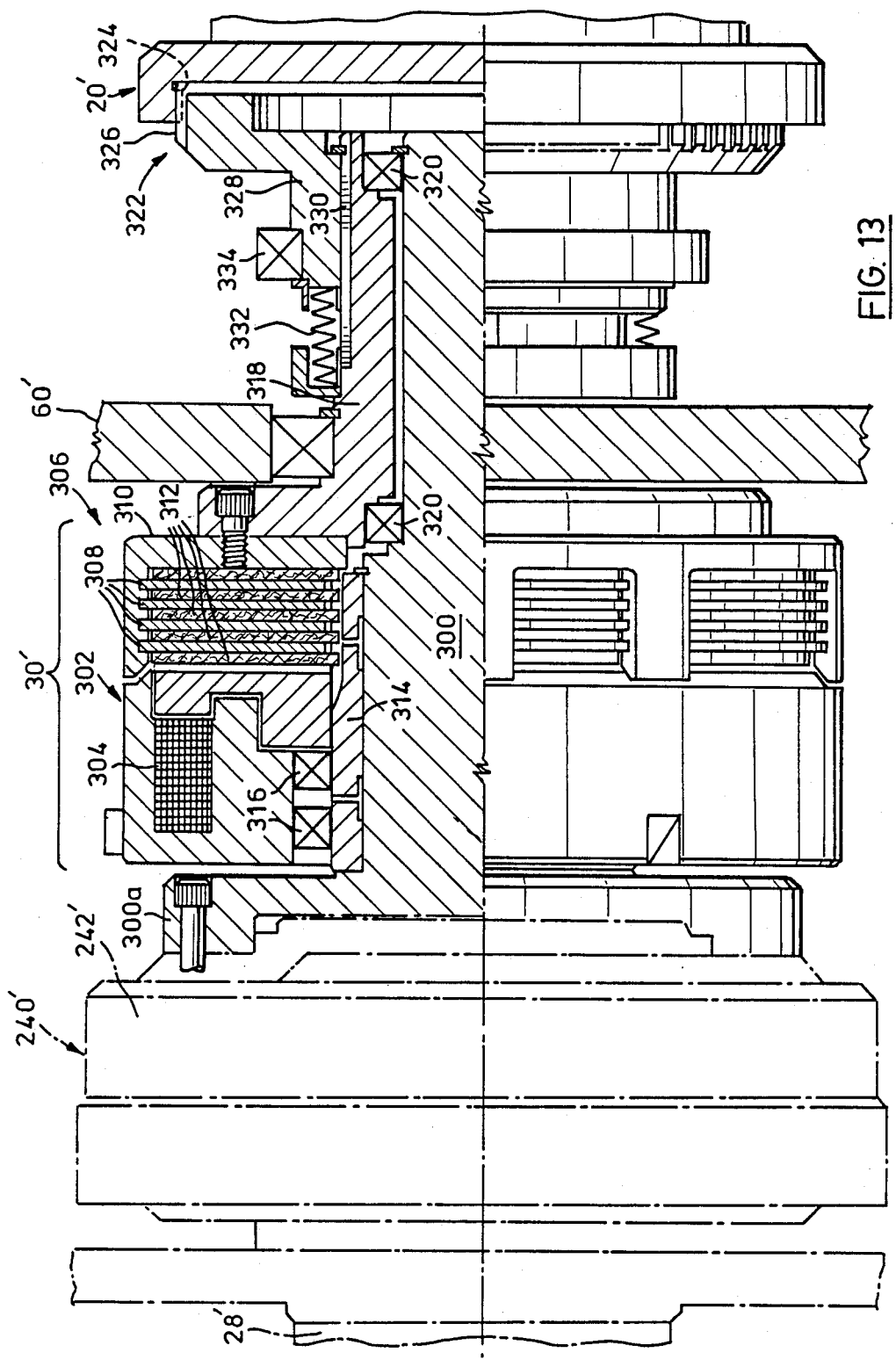
FIG. 13 is an elevational view, partly in section, of an alternative form of spindle drive arrangement.

Finally, FIG. 13 illustrates an alternative form of spindle drive arrangement that may be used in place of the drive arrangement discussed previously. In FIG. 13, primed reference numerals have been used to denote parts which correspond with parts shown in previous use.

The drive arrangement shown in FIG. 13 is designed for use primarily in applications in which extraordinarily high torque loads are generated. To accommodate these loads, a multi-plate clutch is employed in place of the single plate clutch previously described. In addition, the transmission between each drive motor and the associated chuck is coupled directly to the drive motor instead of being incorporated in the spindle as in the previous embodiment. This allows a larger and more robust transmission to be constructed than is possible where the transmission has to be incorporated within the spindle.

Referring now more specifically to FIG. 13, the multi-plate clutch is generally denoted by reference numeral 30' and is shown positioned between a drive momeator, part of which is shown in ghost outline and denoted 28', and a spindle of the machine, part of which is denoted 20'. The spindle itself is the same as the spindle described previously except in that the drive transmission 240 (see e.g. FIG. 8) has been omitted from the spindle and, in effect, re-positioned between the drive motor 28' and the multi-plate clutch 30'. In FIG. 13, the transmission is shown in ghost outline at 240' and is essentially the same as the transmission described previously except for its location. Thus, an input shaft of the transmission is driven by an output shaft of motor 28', neither of which are shown, and the transmission has a casing 242' which it rotates at a speed related to the drive motor output shaft speed when the motor is in operation.

A transmission shaft 300 transmits drive from transmission 240' and is coupled to the transmission casing 242' by way of a flange 300a which is bolted to the casing. Clutch 30' includes a stationary part 302 which is coupled to the frame of the machine (not shown) and which includes a coil 304, and a movable part 306 which includes a series of annular clutch plates disposed parallel to one another within a housing 310. Alternate ones of those plates, denoted 308, are coupled to the central shaft 300 by a spline arrangement generally indicated at 312 and including a sleeve 314 secured to shaft 300, while the intervening plates 312, float freely. Bearings 316 rotationally support the stationary clutch part 302 on sleeve 314. Thus, the plates 308 rotate with the shaft 300 when the motor 28' is running, while the intervening clutch plates 312 and the housing 310 remain stationary. When the coil 304 is energized the clutch plates 308 and 312 and housing 310 are drawn together and all rotate with the shaft 300.

Housing 310 is itself coupled to a further sleeve 318 which rotates on shaft 300 by way of bearings 320. A secondary, toothed clutch arrangement generally indicated at 322 is then provided for coupling sleeve 318 to the spindle 20'. This clutch arrangement includes an annular internally toothed gear 324 on spindle 20 and a complimentary externally toothed gear 326 on the clutch member 328. Member 328 is coupled to sleeve 318 by splines 330 which allow the clutch member 328 to slide in the axial direction of shaft 300 to engage or disengage the teeth 324 and 326. Clutch member 328 is biased by spings 332 to normally maintain such engagement but the clutch member can be retracted against its spring biasing by an actuator (not shown) to disengage the transmission from the spindle and permit the carrier of the machine to be indexed at appropriate times. The actuator for the secondary clutch engages behind a bearing 334 on clutch member 328 and is coupled to the rod 162 for the carrier latching mechanism (best seen in FIG. 3). Thus, the actuator is arranged to release the secondary clutch 322 when the carrier latches are released and to permit the clutch to engage when the latches are engaged.

In this particular embodiment, clutch 30' is a Siemens stationary field multiple disc clutch available from Siemens AG of West Germany.

It will, of course, be understood that the preceding description relates to particular preferred embodiments of the invention only and that many modifications are possible within the broadest scope ofthe invention. For example, it will be understood that various features of the invention may be used independently of one another. For example, a feature of stationary individual drive motors for the spindles could be used with a carrier for indexing the spindles other than of the form specifically described. It would, in fact, be possible (although not desirable) to index the spindles using a conventional carrier structure. Conversely, the particular carrier structure described, in which the carrier includes a central support shaft, could be used with other spindle drive arrangements, even if conventional character.

Among other possible modifications are the fact that spindles of different forms could be used and that the number of stations provided in the machine may vary. Normally, the minimum number of stations would be two and the maximum eight but again there is no limitation to these particular numbers. Preferably, a loading-/unloading station is provided because this allows loading and unloading to be carried out at one station while machining goes on at other stations. However, again this is not essential; loading and unloading could be carried out simply by temporarily arresting one of the spindles at a normal machining station.

We claim:

1. A machine tool comprising:
   a frame;
   a plurality of spindles, each rotatable ab out an axis and each including workpiece holding means at an end of the spindle;
   a carrier supporting said spindles in axially parallel positions for indexing about an axis paralle lto said spindle axis, the carrier including a central shaft defining said carrier axis, spindle support means coupled to said shaft inwardly of its ends and supporting the spindles with the said workpiece holding means exposed at a first end of the carrier;
   means supporting the shaft on the frame at positions outwardly of the carrier for permitting turning of the carrier about its said axis to index the spindles between machining stations, the shaft extending beyond said first end of the carrier a distance sufficient to permit said indexing and machining of workpieces at said stations, without interference by said support means;
   means for indexing said carrier;
   locking means acting between the frame and carrier and operable to lock the carrier with respect to the frame in each of a plurality of defined angular positions and precisely locate the spindles at said stations, said locking means comprising a latch device including a latch bolt movable in a direction parallel to said carrier axis between a locked position and an unlocked position, and a series of latch blocks each engageable by said bolt for locking the carrier in one of said defined angular positions; and,
   means for driving the spindles for machining of workpieces carried thereby.

2. A machine tool as claimed in claim 1, wherein said indexing means comprises a motor driven shaft and mechanical means coupling said drive shaft and carrier central shaft, and wherein the indexing means further comprises a mechanical interlock between said mechanical coupling means and said latch device adapted to move said latch bolt to its unlocked position immediately prior to indexing of the carrier and to move said latch bolt to its locked position immediately after said indexing has been completed.

3. A machine tool as claimed in claim 2, wherein said mechanical means coupling the motor driven drive shaft and carrier central shaft comprising a Geneva cam mechanism comprising a hub carried by said carrier central shaft and including a plurality of cam tracks, and a driving cam follower driven from said shaft and adapted to engage in said cam tracks and intermittently rotate said hub in accordance with the required operating conditions of the machine tool.

4. A machine tool as claimed in claim 1, wherein said spindle support means of the carrier comprise a series of plates spaced along said central shaft in planes generally at right angles to said carrier axis, said plates being formed with openings receiving the spindles, said plates and shaft being made of steel and being welded together to form a rigid integral carrier structure.

5. A machine tool as claimed in claim 1, further comprising a tool support carried by the portion of said shaft which extends beyond the first end of the carrier, the tool support being coupled to the frame of the machine tool and being adapted to permit turning of said shaft with respect to the tool support.

6. A machine tool as claimed in claim 1, wherein said means for driving the spindles is supported by said frame adjacent second ends of the spindles remote from said workpiece holding means and includes a number of individual spindle drive motors each disposed in a fixed position aligned with one of said machining stations;
   and wherein the machine tool further includes clutch means comprising respective driven clutch members at said second end of each said spindle and co-operable driving clutch member means drivably coupled to each spindle drive motor, said clutch means being operable to drivingly couple each spindle drive motor to the relevant one of said spindles when the carrier has been indexed to bring that spindle to a said station at which a machining operation is to be performed, and being disengageable to permit indexing of the carrier.

7. A machine tool as claimed in claim 6, wherein said stations between which the spindles are indexed include a loading/unloading station at which a spindle can be brought to rest for loading and unloading of workpieces, and at least one machining station at which a machining operation can be performed on a workpiece, and wherein the number of drive motors corresponds to the number of machining stations, there being no drive motor corresponding to said loading/unloading station.

8. A machine tool as claimed in claim 7 further comprising brake means supported by said frame adjacent a second end of the carrier and disposed in a fixed position aligned with said loading/unloading station, said brake means being adapted to engage the driven clutch plate of a spindle at said loading/unloading station and hold said spindle stationary.

9. A machine tool as claimed in claim 6, wherein each said spindle drive motor is an infinitely variable electric motor, whereby the machining speed of a spindle driven by said motor can be infinitely varied according to required machining conditions.

10. A machine tool as claimed in claim 6, wherein each said spindle includes transmission means between said driven clutch member at the second end of the spindle and said workpiece holding means, said transmission means being adapted to provide a predetermined fixed speed transmission ratio between said driven clutch member and the workpiece holding means.

11. A machine tool as claimed in claim 10, wherein said transmission means comprises a planetary gear transmission.

12. A machine tool as claimed in claim 6, wherein said clutch means comprises an electromagnetic clutch associated with each spindle drive motor and including means adapted to electromagnetically couple said driving clutch plate of each said motor with the driven clutch plate of any one of said spindles.

13. A machine tool comprising;
    a frame;
    a plurality of spindles each rotatable about an axis and each including workpiece holding means at a first end of the spindle;

a carrier supporting said spindles in axially parallel positions with said workpiece holding means accessible at a first end of the carrier;

means for indexing the carrier about an axis parallel to said spindle axes to move the spindles between defined stations;

locking means acting between the frame and carrier and operable to lock the carrier with respect to the frame in each of a plurality of defined angular positions and precisely locate the spindles at said stations, said locking means comprising a latch device carried by said frame and including a latch bolt engageable in one of a series of latch blocks carried by said carrier at positions corresponding to locking of the carrier in said stations, said latch bolt being movable in a direction parallel to said carrier axis between a locked position in an engagement with one of said latch blocks, and an unlocked position;

spindle drive means supported by said frame adjacent a second end of the carrier and including a number of individual spindle drive motors each disposed in a fixed position aligned with one of said stations;

clutch means including: a driven clutch plate at a second end of each said spindle and a co-operable driving clutch plate coupled to each spindle drive motor, said driven and driving clutch plates being disposed in respective parallel planes transverse to said carrier axis; and means for moving the said clutch plates between engaged positions in which the driving clutch plate makes face-to-face contact with the driven clutch plate to drivingly couple the associated spindle drive motor to the relevant said spindle, and disengaged positions in which the said plates are spaced by a clearance gap sufficient to permit free indexing of the carrier with respect to the driving clutch plate.

* * * * *